UNITED STATES PATENT OFFICE 2,035,136

CONDIMENTATION OF FOOD PRODUCTS

Arthur A. Levinson and Lawrence K. Pillsbury, Chicago, Ill., assignors to Wm. J. Stange Co., Chicago, Ill., a corporation of Illinois No Drawing. Application April 9, 1934,
Serial No. 719,753

2 Claims. (Cl. 99—140)

This invention relates to a composition for the condimentation of food products and to a method of preparing such composition. More particularly, the invention relates to a dry appearing, siftable composition containing a soy bean product as a base or carrier for flavoring materials, such as oleoresins and essential oils. The seasoning composition of this invention is suitable for the condimentation of food products generally and especially of ground meat, such as sausage meat, and other meat products.

It has heretofore been suggested to use a sugar as the base for flavoring materials in the preparation of a dry seasoning composition. Sugars, however, are of a crystalline nature and do not readily absorb and retain the liquid and semi-solid flavoring materials, such as oleoresins and essential oils that are customarily used in the preparation of condiment compositions. Although these flavoring materials are to some extent absorbed by the sugars and held thereby, they are not bound to the sugars so fixedly as is desirable.

It is therefore an important object of this invention to provide a composition for the condimentation of food products wherein the liquid and semi-solid flavoring materials, such as oleoresins of peppers and essential oils of spices, are firmly bound by absorption and adsorption to a suitable carrier comprising a soy bean product.

It is a further important object of this invention to provide a method of preparing a condiment composition in a dry appearing, pulverulent form and containing a soy bean product as a carrier for flavoring materials, such as oleoresins and essential oils.

Other and further important objects of this invention will become apparent from the following description and appended claims.

The base or carrier of our invention for the flavoring materials is a product derived from soy beans. This product may either be a soy bean flour prepared from the whole soy bean or from partly or wholly defatted soy beans, or it may be a protein substance obtained from soy beans. Where a partially or wholly defatted soy bean flour is employed, or where a protein portion of soy beans is used, the capacity of the base for carrying the liquid and semi-liquid flavoring materials, such as oleoresins and essential oils, is materially increased, since these oily flavoring materials are absorbed by the soy bean base and bound therewith in place of the original fatty constituents.

In using any of these soy bean products, the liquid and semi-solid flavoring materials, such as oleoresins and essential oils, are mixed therewith in suitable proportions to form a dry appearing, pulverulent mixture that can be readily sieved when used for condimentation purposes. In general, the flavoring materials may be used in amounts from about ½ to 15% by weight of the mixture, but 6% is a more usual figure for the percentage of flavoring material by weight of the preparation. It will be understood, of course, that these proportions are given merely by way of example and that larger percentages of flavoring material in the mixture may be prepared, since the soy bean product can carry even more than 15% of the flavoring material without making the product incapable of being sifted.

Where soy bean grits are used, the flavoring materials may be added directly to the grits and the mass ground to a flour. In this case the oleo-resins and oils are ground into and absorbed by the flour to produce a dry appearing, pulverulent mixture.

Preferably, no water as such is added to the mixture, although the soy bean product will often contain upwards of 7% of moisture naturally associated with it. This capacity of the soy bean product to carry both moisture and oily liquids without becoming visibly wet and caking objectionably is one of the important characteristics that adapts it for use as a carrier in the composition of our invention. At the same time, the soy bean product is not noticeably hygroscopic, as is the case with some sugars, so that no difficulties from this cause are experienced in handling the composition of our invention. The moisture content of the composition may be as high as from 10 to 20% without changing its flour-like, and therefore siftable, properties.

The oleo-resins that may be used in making up our composition are those commonly employed for this purpose and comprise, among others, the oily liquid or semi-solid portions obtained from black peppers, either natural or decolorized, red peppers, ginger, nutmeg, and the like.

The essential oils to which reference has been made above are also those customarily employed in the manufacture of condiment preparations, such as are obtained from mace, nutmeg, coriander and other spices.

One of the principal advantages of our composition is that there is no separation of the oily flavoring materials from the carrier nor do these flavoring materials cook off from the carrier as readily as is the case where a sugar base is employed. In the condimentation of meat and meat products, the composition of our invention becomes an integral part of the meat owing to the fixative properties of the soy bean product toward the flavoring materials. In practice, from ½ to 1% by weight of our seasoning composition is added to the meat or other food product that is to be seasoned.

Our condiment composition, in its preferred form, is an apparently dry, pulverulent mixture of a flour-like and therefore siftable character. It does not cake nor gum any more than natural soy bean flour would. The oily flavoring material portion of our composition is firmly bound and fixed to the solid soy bean portion, as by absorption and adsorption.

Where the term "solid soy bean product" is used in the claims, it will be understood to include various substances derived from soy beans, such as soy bean flour, a partially or wholly defatted soy bean flour and protein fractions of soy beans.

It will be understood that other ingredients, such as salt, diluents and the like may be added to our seasoning composition without materially changing its properties. For instance, salt in proportions up to 25% by weight of the composition may be incorporated thereinto with some benefits with respect to the keeping qualities of the composition.

We are aware that numerous details of the process may be varied through a wide range without departing from the principles of this invention, and we, therefore, do not purpose limiting the patent granted hereon otherwise than necessitated by the prior art.

We claim as our invention:

1. A composition for the condimentation of food products, comprising a siftable powdered solid soy bean product having oleoresins and essential oils of spices absorbed therein and distributed therethrough in an amount equal to from ½ to 15% of combined oleoresins and essential oils by weight of the mixture, the soy bean product serving as a carrier for said oleoresins and essential oils and as a fixative for the flavors thereof.

2. A composition for the condimentation of food products, comprising a siftable powdered solid soy bean product having oleoresins and essential oils of spices absorbed therein and distributed therethrough in an amount equal to about 6% of combined oleoresins and essential oils by weight of the mixture, the soy bean product serving as a carrier for said oleoresins and essential oils and as a fixative for the flavors thereof.

ARTHUR A. LEVINSON.
LAWRENCE K. PILLSBURY.